United States Patent [19]

Hashimoto

[11] Patent Number: 4,520,080

[45] Date of Patent: * May 28, 1985

[54] ELECTROLYTES CIRCULATION TYPE CELL STACK SECONDARY BATTERY

[75] Inventor: Takafumi Hashimoto, Tokyo, Japan

[73] Assignee: Meidensha Electric Mfg. Co., Ltd., Tokyo, Japan

[*] Notice: The portion of the term of this patent subsequent to Nov. 22, 2000 has been disclaimed.

[21] Appl. No.: 374,077

[22] Filed: May 3, 1982

[51] Int. Cl.³ .............................................. H01M 8/24
[52] U.S. Cl. ...................................... 429/18; 429/70; 429/72
[58] Field of Search ...................... 429/18, 72, 70, 80, 429/81

[56] References Cited

U.S. PATENT DOCUMENTS 4,197,169  4/1980  Zahn et al. ............................. 429/18
4,279,732  7/1981  Bellows et al. ........................ 429/18

Primary Examiner—M. J. Andrews
Attorney, Agent, or Firm—Fleit, Jacobson, Cohn & Price

[57] ABSTRACT

The invention relates to an electrolytes circulation type cell stack secondary battery of the construction in which the electrolytes are circulated in a parallel manner. In order to absorb small shunt electrical currents, an electrode is arranged in the vicinity of each of the cathode electrolyte inlet and outlet channels of low-potential-side one of the secondary cells and the electrodes are connected to the cathode terminal of the cell stack secondary battery.

14 Claims, 21 Drawing Figures

CELL CHANNEL POSITION

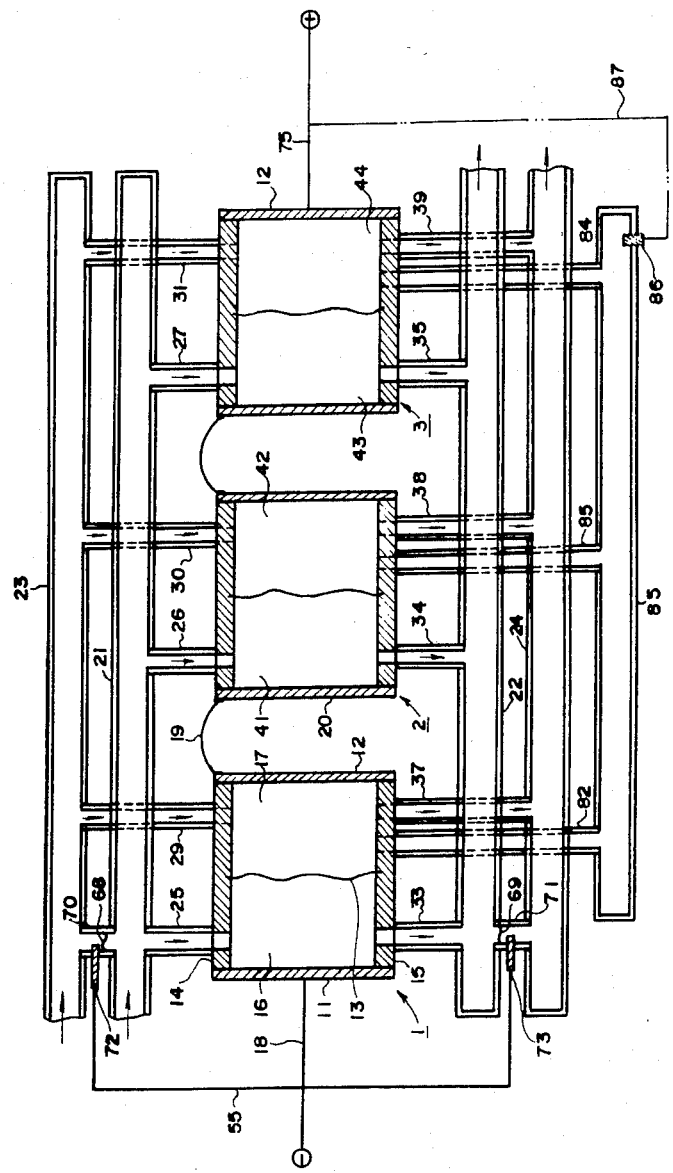

ELECTROLYTES CIRCULATION TYPE CELL STACK SECONDARY BATTERY

BACKGROUND OF THE INVENTION

The present invention relates to electrolytes circulation type cell stack secondary batteries, particularly those in which the negatively active material is a metal such as cadmiun, zinc or lead, and more particularly the invention relates to such secondary battery which suppresses and prevents the occurrence of three problems due to the flow of small shunt current, i.e., (1) shunt current loss, (2) inequality of quantity of charged electricity and (3) occurrence of abnormal electrodeposition.

DESCRIPTION OF THE PRIOR ART

Known cell stack batteries of the above type are designed so that generally, with a view to producing a high voltage from practical point view, a plurality of secondary cells are arranged in layers and connected in series such that each of the electrolytes is supplied to the cathode chamber or the anode chamber of each secondary cell via its cathode electrolyte inlet channel or anode electrolyte inlet channel from a cathode electrolyte inlet-side common manifold or an anode electrolyte inlet-side common manifold and the electrolyte is delivered via the cathode electrolyte outlet channel or the anode electrolyte outlet channel of each secondary cell and through a cathode electrolyte outlet-side common manifold or an anode electrolyte outlet-side common manifold.

Thus, since the plurality of secondary cells are connected in series and the circulation of the electrolytes is effected in a parallel connection manner, a small current is diverted to each of the inlet and outlet sides of each secondary cell due to the potential difference between the low potential side electrode and the high potential side electrode of the plurality of series connected cells, thus giving rise to the following difficulties.

(1) Shunt current loss: The loss of heat in the manifolds and the channels due to the flow of small shunt currents.

(2) Unequality of quantity of charged electricity: Since the current value (mA) of small shunt current flow through the channels of the respective cells differs from one cell to another, the value of current flow through the electrodes of the respective cells differs from one cell to another with the resulting unequality of the electrodeposition on the cathode or the quantity of charged electricity.

(3) Occurrence of abnormal electrodeposition: At the low potential side cathode ends to which a small current flows even a small shunt current may result in the occurrence of abnormal electrodeposition due to the current concentration.

Many different proposals have heretofore been made to overcome such deficiencies due to the flow of small shunt current. For instance, the manifolds and the channels are decreased in diameter and increased in length so as to increase the electric resistance of the electrolytes in the minifolds and the channels and thereby to decrease the shunt current value. While this known method has the effect of providing improvements on some of the foregoing deficiencies due to the flow of shunt current, i.e., the shunt current loss and the unequality of quantity of charged electricity, even if the shunt current is decreased, the shunt current flows in the same direction during the charging period as well as the discharging period with the result that abnormal electrodeposition is caused as the cycle of charge and discharge is repeated, thus impeding the circulation of the electrolytes and causing a short-circuit between the secondary cells and thereby giving a limitation to the cycle life.

Another method has been proposed (U.S. Pat. No. 4,197,169) in which a protective current is supplied to the manifolds so that the potential distribution in the manifolds is made equal to the potential distribution in the respective secondary cells thereby overcoming the deficiencies due to the flow of shunt current. While this method prevents the occurrence of shunt current with the resulting solution of the foregoing problems due to the flow of shunt current, the supply of the additional protective current produces an additional energy loss. While this energy loss can be reduced to some extent by decreasing the diameter of the manifolds, there is a limit to the decrease in the manifold diameter since this gives rise to ununiformness in the circulation of the electrolytes to the secondary cells and increase in the fluid head loss for the circulation pumps and thus this prior art method still has the problem of energy loss due to the protective current.

SUMMARY OF THE INVENTION

The present invention has been made as a result of various studies and research works made with a view to overcoming the foregoing deficiencies in the prior art, and it is the primary object of the invention to provide an improved electrolytes circulation type cell stack secondary battery capable of preventing the occurrence of abnormal electrodeposition, eliminating the unequality of quantity of charged electricity and reducing the amount of shunt current loss.

BRIEF DESCRIPTION OF THE DRAWINGS

FIGS. 1, 3, 4, 6(a), 7, 10, 13 and 14 show model longitudinal sectional views of cell stack secondary batteries according to specific embodiments of the invention.

DESCRIPTION OF THE PREFERRED EMBODIMENTS

The present invention will now be described in greater detail with reference to the illustrated embodiments.

Figure 1:
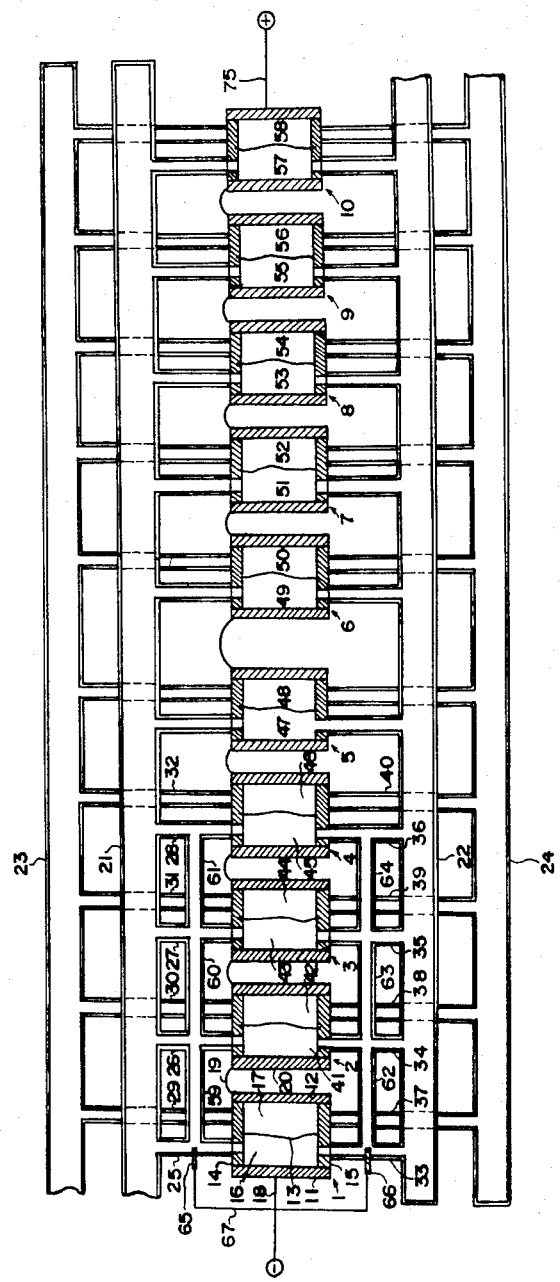

FIG. 1 shows an embodiment of this invention in which the adjoining cathode electrolyte channels of low-potential-side secondary cells of a cell stack secondary battery are interconnected with small diameter pipes and additional electrodes are arranged in the vicinity of the junctions between the pipe and the channels of the lowest-voltage secondary cell so as to be connected to and held at the same potential as the cathode terminal of the cell stack secondary battery. By so constructing, it is intended to absorb by these additional electrodes any small current flowing to each cell and thereby to prevent the occurrence of abnormal electrodeposition due to the flow of small shunt current, thus increasing the service life of the battery when it is used in cycles. This embodiment will now be described with reference to the Figure.

In the Figure, numerals 1, 2, 3 . . . , 10 designate secondary cells and the illustrated embodiment includes ten secondary cells arranged in layers. The description will now be made mainly with reference to the secondary cell 1. Numeral 11 designates a cathode, 12 an anode, and 13 an ion transmission separator arranged practically midway between the electrodes 11 and 12. Numeral 14 and 15 designate electrode frames. Numeral 16 designates a cathode chamber, 17 an anode chamber, and 18 a cathode terminal of the secondary cell 1. The anode 12 of the cell 1 is connected to a cathode 20 of the adjoining secondary cell 2 by a connector 19. Of course, where it is desired to provide a bipolar type cell stack battery, it is only necessary to arrange in layers only one or the other of the anode 11 and the cathode 12 which have the same potential.

Numeral 21 designates a cathode electrolyte inlet-side common manifold, 25, 26, 27, 28, . . . cathode electrolyte inlet channels for connecting the cathode electrolyte inlet-side common manifold 21 to the cathode chambers 16, 41, 43, 45, . . . Numeral 22 designates a cathode electrolyte outlet-side common manifold, and 33, 34, 35, 36 . . . cathode electrolyte outlet channels for connecting the cathode electrolyte outlet-side common manifold 22 to the cathode chambers 16, 41, 43, 45, . . . In the like manner, numeral 23 designates an anode electrolyte inlet-side common manifold 24, an anode electrolyte outlet-side common manifold, 29, 30. 31, 32, . . . anode electrolyte inlet-channels, and 37, 38, 39, 40, . . . anolyte oulet channels. These electrolyte inlet channels 25, 26, 27, 28, . . . and 29, 30, 31, 32, . . . and the electrolyte outlet channels 33, 34, 35, 36, . . . and 37, 38, 39, 40 . . . are extended perpendicular to the layer-building direction of the electrode frames 14 and 15 and arranged side by side along the electrode frames 14 and 15.

The cell stack secondary battery constructed as described above is the same with the prior art battery so that the cathode electrolyte is fed into the cathode chambers 16, 41, . . . of the secondary cells, 1, 2, . . . by a pump (not shown) by way of the cathode electrolyte inlet-side common manifold 21 and the electrolyte inlet channels 25, 26, . . . , and the electrolyte is delivered to the outlet-side common manifold 22 by way of the electrolyte outlet channels 33, 34, . . . On the other hand, the anode electrolyte is introduced into the anode chambers 17, 42, . . . , of the secondary cells 1, 2, . . . , by a pump (not shown) from the anode electrolyte inlet-side common manifold 23 via the electrolyte inlet channels 29, 30, . . . , and the electrolyte is delivered to the anode electrolyte outlet-side common manifold 24 via the anode electrolyte outlet channels 37, 39, . . . .

In accordance with the invention, the cell stack secondary battery constructed as described above is further provided with small-diameter pipes 59, 60, 61 and 62, 63, 64 which respectively interconnect the adjoining ones of the low-voltage-side cathode electrolyte channels 25, 26, 27, 28 and 33, 34, 35, 36 of the secondary cells 1, 2, 3, 4, . . . . Since these pipes 59, 60, . . . , 64 are not intended for substantial flow of the cathode electrolyte therethrough, it is only necessary that these pipes are filled with the cathode electrolyte to simply connect the adjoining channels electrically by the cathode electrolyte and thus they can be extremely small in diameter. When the cell stack secondary battery is in operation, a shunt electrical current also flows to the pipes.

Thus, in order to reduce the loss due to the shunt electrical current, the pipes should be as small as possible in diameter and hence electric resistance within the pipes should be as high as possible.

In addition, electrodes 65 and 66 are respectively arranged in the vicinity of the junctions between the pipes 59 and 62 of the cathode electrolyte channels 25 and 33 of the secondary cell 1 having the lowest voltage and the electrodes 65 and 66 are connected electrically to the cathode terminal 18 of the cell stack secondary battery by a connector 67 to maintain them at the same electrical potential as the cathode 11. The electrodes 65 and 66 may be mounted by for example fitting them into the cathode electrolyte channels 25 and 33, respectively, and hermetically fixing them in place.

Figures 2A, 2B:
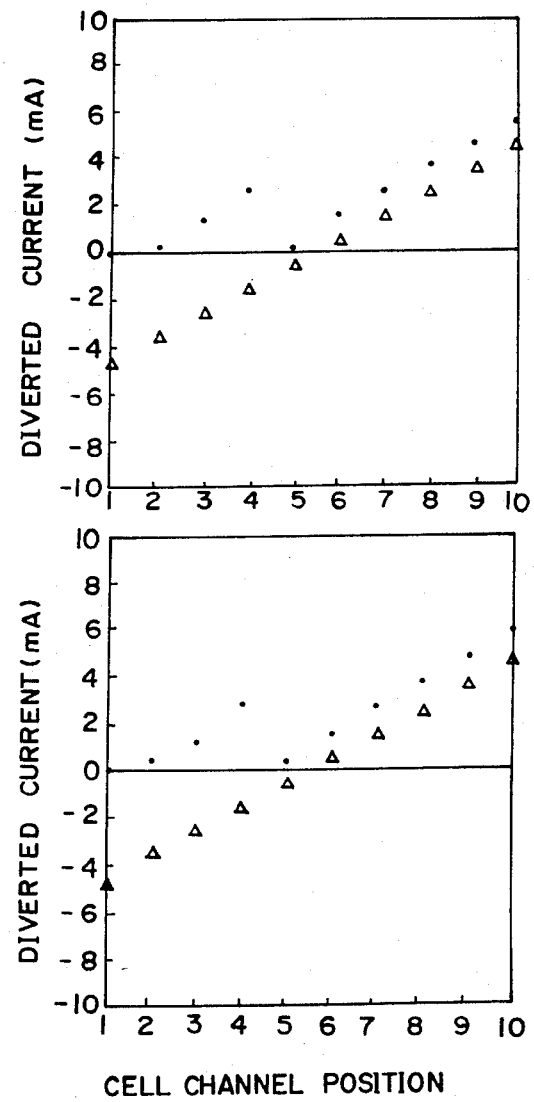
FIGS. 2(a), 2(b), 5(a), 5(b), 5(c), 5(d), 9(a), 9(b), 9(c) and 12 show the behavior of the batteries during the charging period.

FIG. 2 shows characteristic diagrams showing the results of the shunt current measurement during the charging period of the cell stack secondary batteries. In the Figure, marks "Δ" show the results of the prior art cell stack battery and spot marks show the results of the cell stack battery according to the invention. In the FIG., 2 (a) shows the measurement results at the cathode electrolyte inlets, and 2 (b) shows the measurement results at the cathode electrolyte outlets. The ordinate represents the shunt current value (mA) and the abscissa represents the channel positions of the respective secondary cells. The value of the shunt electrical current flowing out of each cathode chamber is designated as positive. This test was effected by measuring the shunt eletrical current values of the respective channels with a clip-on ammeter and the values indicate those at the expiration of 90 to 100 minutes after the start of the charging with the charging voltage of 22 V and the charging current of 12 A. As will be seen from FIG. 2, there was a small current flow to each of the cathodes of the prior art cell stack battery and the flow of small current to the cathode was completely eliminated in the case of the cell stack battery of this invention.

When the test was continued further and the batteries were disassembled after the expiration of 25 hours through the cycles of charge and discharge to compare the electro-deposition of zinc on the cathodes, the electrodeposition of dendritic zinc on the cathode was seen in the vicinity of the channels in the prior art battery and there was no such abnormal electrodeposition in the battery incorporating the present invention. Then, the loss caused in the channels and the manifolds due to the provision of the electrodes 65 and 66 was calculated from the measured shunt current values and electric resistances of the electrolytes in the manifolds and the channels and the result was 0.9 W in the case incorporating the present invention showing only a very slight increase over 0.6 W of the prior art battery.

When the protective current according to the invention of U.S. Pat. No. 4,197,169 was applied to the above prior art battery, the required protective current was about 280 mA and the calculated system loss was 21.5 W. While this battery is capable of realizing some decrease in the loss due to the protective current by decreasing the diameter of the manifolds, it is difficult to decrease the loss to the level of the present invention due to the limitations imposed by the circulation of the electrolytes and the pump loss.

Figure 3:
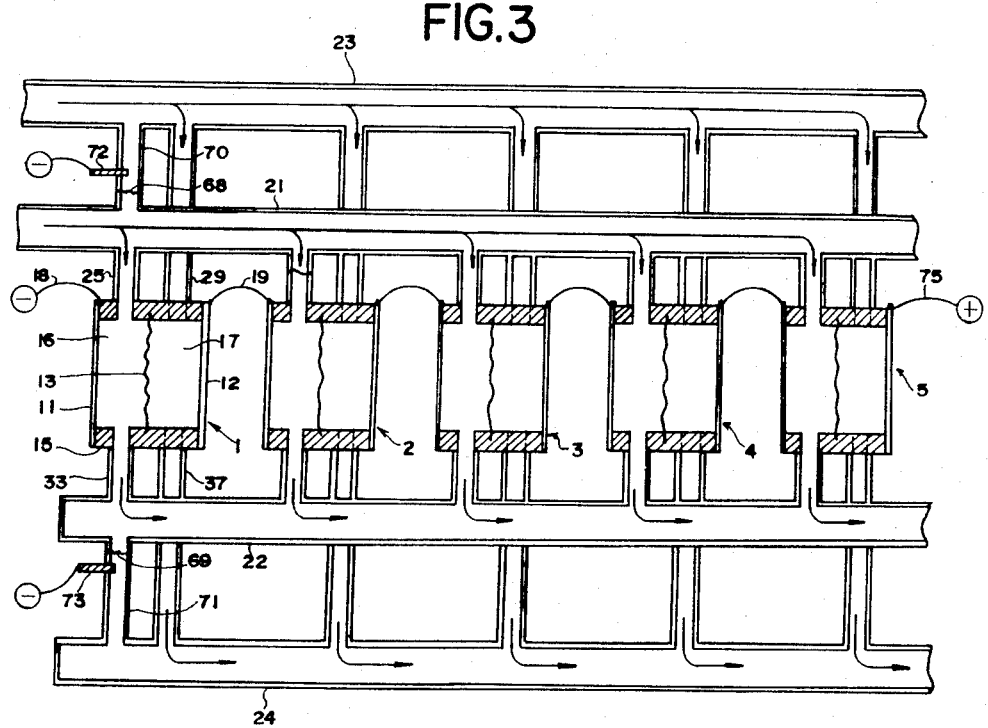

FIG. 3 shows another embodiment of the present invention which differs from the first embodiment in that the cathode electrolyte manifolds 21 and 22 of the cell stack secondary battery are respectively connected to the anode electrolyte manifolds 23 and 24 by channels 70 and 71 by way of ion transmission separators 68 and 69 and additional electrodes 72 and 73 arranged at positions where they are immersed in the anode electrolyte and are connected to the cathode 11 of the secondary cell 1, thereby absorbing any small shunt current.

The transmission separators 68 and 69 transmit ions but they do not transmit the electrolytes.

Of course, the electrodes 72 and 73 may respectively be fitted into the anode electrolyte manifolds 23 and 24.

Figure 4:
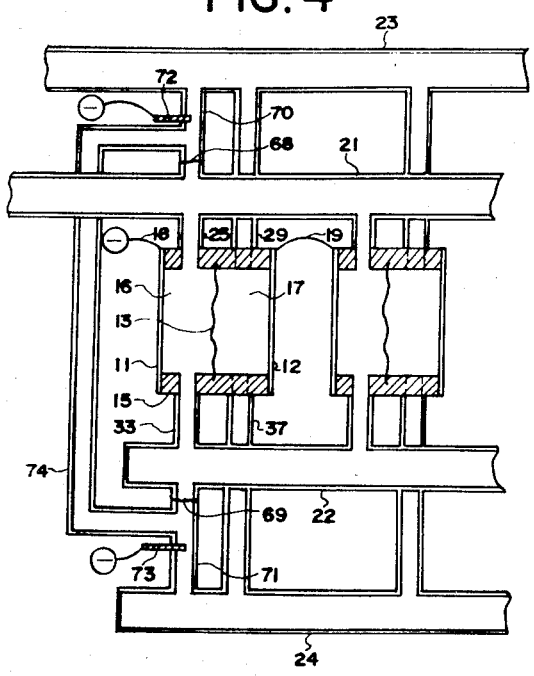
Figure 5A:
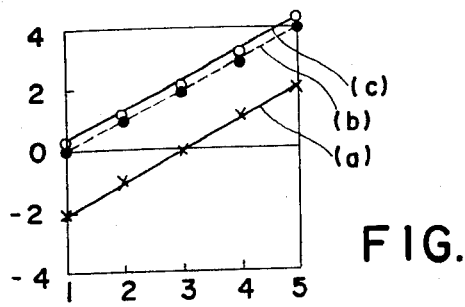
Figure 5B:
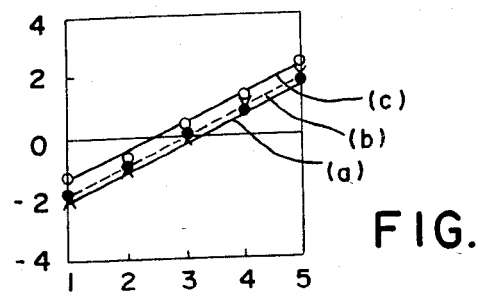
Figure 5C:
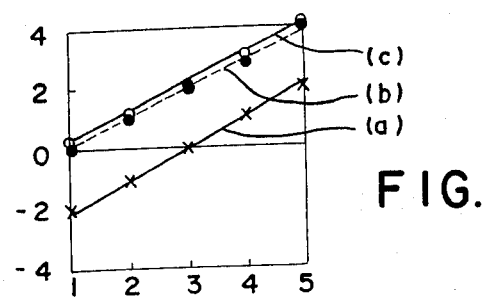
Figure 5D:
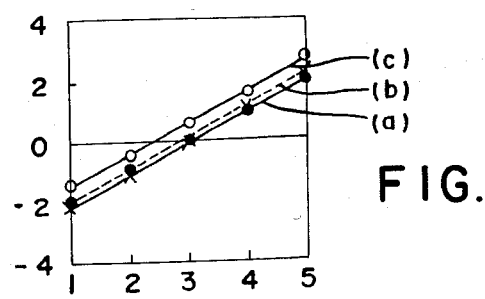

Also, as shown in the modification of the invention in FIG. 4, the connecting channels 70 and 71 may be interconnected by a bypass pipe 74 so that they are interconnected on the anode electrolyte side.

By virtue of this modification, the anode electrolyte is circulated so as to satisfactorily supply the bromine in the electrolyte to the additional electrodes 72 and 73.

In either of the cases, the electrodes 72 and 73 are immersed in the anode electrolyte so that a reaction of $Br^-_2 \rightarrow 2Br - 2e^-$ occurs and no electrodeposition of Zn takes place, thus maintaining the electrode surfaces in the initial condition. As a result, no maintenance is required for the electrodes 72 and 73 over a long period of service. Then, in the respective secondary cells 1, 2, ..., a reaction of $Zn^{++} + 2e^- \rightarrow Zn$ occurs in the cathode chambers 16, 41, ... and a reaction of $2Br_2 \rightarrow Br_2 + 2e^-$ occurs in the anode chambers 17, 42, ..., thus delivering a desired voltage across the cathode terminal 18 and an anode terminal 75.

FIG. 5 shows characteristic diagrams showing by way of examples the results of shunt current measurements during the charging period of the battery shown in FIG. 3, with (A) showing the shunt current values mA at the cathode electrolyte inlets, (B) those at the anode electrolyte inlets, (C) those at the cathode electrolyte outlets and (D) those at the anode electrolyte outlets. The positive shunt current values represent the shunt currents flowing out to the manifolds from the cathode and the negative values represent those flowing into the cathode. The abscissa represents the channel positions of the respective secondary cells (here the number of the cell stack secondary cells is 5). In each of the characteristic diagrams, (a) shows the prior art battery (without the electrodes 72 and 73), (b) shows the most simplified form of cell stack secondary battery, i.e., the battery of FIG. 1 without the pipes 59, 60, . . . 63, 64, and (c) shows the cell stack secondary battery of FIG. 3 in comparison with one another. Note that in accordance with this test, the shunt current values of the respective channels indicate those measured by a clip-on ammeter. In this test, the charging voltage was 11.3 V, the charging current was 12 A and the current values were those measured at the expiration of 90 to 110 minutes after the beginning of the charging.

As will be seen from the measurement results, in accordance with the cell stack battery of this invention the flow of shunt current to the cathode of each of the secondary cells was eliminated as was the case with the most simplified cell stack secondary battery. Also, when the test was continued and the batteries were disassembled at the expiration of 25 hours through the 25 cycles of charge and discharge to examine the electrodeposition of Zn on the cathode of the respective secondary cells, there was no occurrence of such abnormal electrodeposition in the case of the cell stack battery of FIG. 3. On the other hand, the examination of the electrode surface condition in the cathode chamber 16 and the anode chamber 17, respectively, showed that in the case of the most simplified cell stack battery (with the electrodes immersed in the cathode electrolyte) the electrodeposition of Zn took place and it took the form of a dendritic abnormal zinc electrodeposition and that no Zn electrodeposition occurred and the initial conditions were maintained in the case of the cell stack battery shown in FIG. 3 (with the electrodes immersed in the anode electrolyte).

From the foregoing description it will be seen that in accordance with the invention there is provided a cell stack secondary battery which eliminates the flow of shunt current to the cathode, thereby eliminating the occurrence of abnormal electrodeposition in the vicinity of the cathode ends and also eliminating the need for maintenance over a long period of service.

Figure 7:
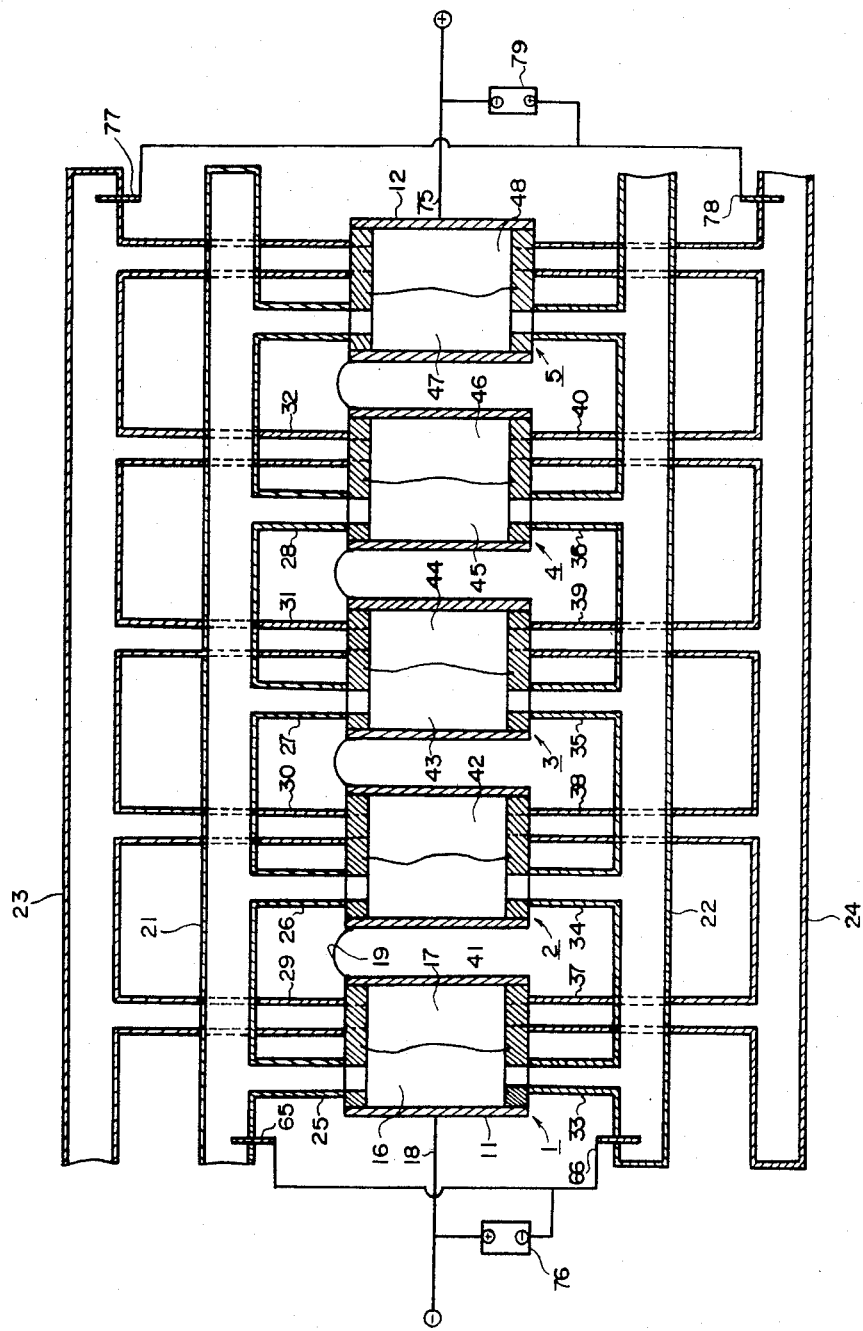

The present invention includes still another form which will be described hereunder. FIG. 7 shows still another embodiment in the form of a zinc bromide system five-layer cell stack secondary battery. As shown in the Figure, electrodes 65 and 66 are fitted respectively into cathode electrolyte manifolds 21 and 22 and their potentials are adjusted by an auxiliary power supply 76 to a value lower than the potential shown by a cathode 11 of a secondary cell 1, thereby preventing any shunt current occurring in the cathode electrolyte circulation system from flowing into cathode chambers 16, 41, 43, . . . of the respective secondary cells from the cathode electrolyte manifolds 21 and 22. Also, electrodes 77 and 78 are respectively fitted into anode electrolyte manifolds 23 and 24 and the potential of these additional electrodes is held by an auxiliary power supply 79 higher than the potential shown by an anode 12 of a secondary cell 5, thereby allowing any shunt current caused in the anode electrolyte circulation system to flow into anode chambers 17, 42, 44, . . . of the respective secondary cells.

Figure 6A:
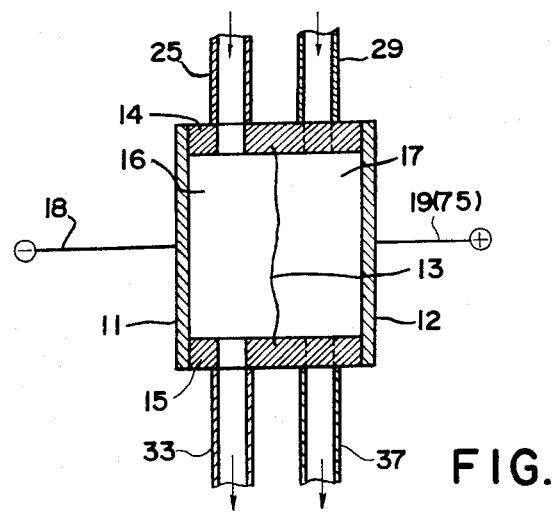
Figure 6B:
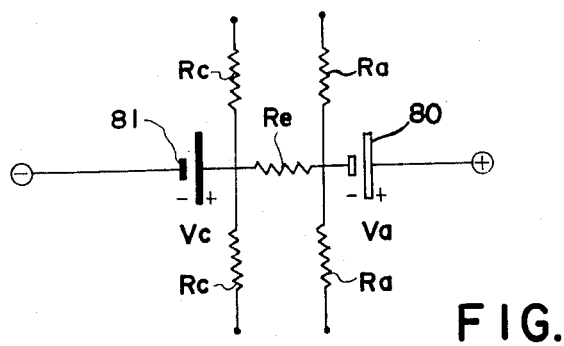
FIGS. 6(b), 8 and 11 are diagrams showing resistance equivalent circuits for the cell stack secondary batteries.

The grounds for the above arrangement will be readily understood from the following description in connection with FIG. 6. More specifically, in the Figure. (a) shows a longitudinal sectional view of a secondary cell and (b) shows the corresponding resistance equivalent circuit. In the Figure, numeral 80 designates an anode, 81 a cathode, Va an anode potential, Vc a cathode potential, and Va+Vc an open-circuit potential of the secondary cell. Also, designated by Rc is a electric resistance of a cathode electrolyte channel liquid Ra an electric resistance of an anode electrolyte channel liquid (the same value is assumed for the outlet and inlet in both cases), and Re a secondary cell internal electric resistance.

Figure 8:
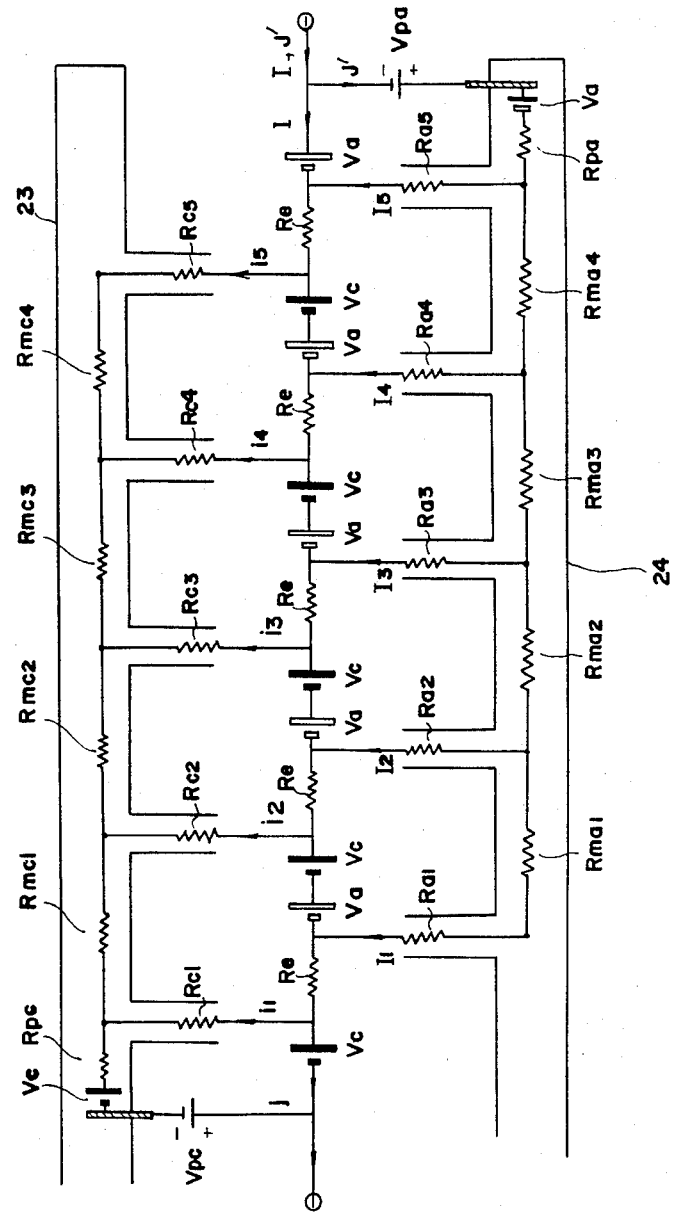

FIG. 8 shows a resistance equivalent circuit of the five-layer cell stack battery of FIG. 7. FIG. 8 is constructed on the basis of the quivalent circuit shown in FIG. 6. If the channels and manifolds on the outlet and inlet sides of the electrolyte circulation paths are respectively selected equal in size, the resistance equivalent circuit can be represented for example on the inlet sides of the electrolyte circulation paths as shown in FIG. 8.

$i_1 \sim i_5$: shunt currents flowing between the cathode chambers and the cathode electrolyte manifold via the respective cathode side channels (the values of shunt currents flowing out of the cathode chambers are assumed negative.)

$I_1 \sim I_5$: shunt currents flowing between the anode chambers and the anode electrolyte manifold via the respective anode side channels (the values of shunt currents flowing into the anode chambers are assumed positive.)

$Rc_1 \sim Rc_5$: cathode side electric resistances of channel internal liquid.

$Ra_1 \sim Ra_5$: anode side electric resistances of channel internal liquid.

$Rmc_1 \sim Rmc_5$: interchannel cathode side electric resistances of manifold internal liquid.

$Rma_1 \sim Rma_5$: interchannel anode side electric resistances of manifold internal liquid. (the numbers are given in order of the five cell stack cells from the lowest potential side).

Vpc: cathode side auxiliary supply voltage.

vpa: anode side auxiliary supply voltage.

J: sum total of shunt currents flowing in the cathode side channels.

J': sum total of shunt currents flowing in the anode side channels.

I+J': input and output current of the cell stack battery,

With these conventions, the following equations are obtained on the anode side according to the Kirchhoff's law.

$$J' = I_1 + I_2 + I_3 + I_4 + I_5 \quad (1)$$

$$Vpa = J' \cdot Rpa + I_5 Ra_5 \quad (2)$$

$$Va + Vc + (I+I_5)Re = I_4 \cdot Ra_4 - I_5 Ra_5 + Rma_4 (I_1+I_2+I_3+I_4) \quad (3)$$

$$Va + Vc + (I+I_5+I_4-i_5)Re = I_3 \cdot Ra_3 - I_4 Ra_4 + Rma_3 \cdot (I_1+I_2+I_3) \quad (4)$$

$$Va + Vc + (I+I_5+I_4+I_3-i_5-i_4)Re = I_2 Ra_2 - I_3 Ra_3 + Rma_2(I_1+I_2) \quad (5)$$

$$Va + Vc + (I+I_5+I_4+I_3+I_2-i_5-i_4-i_3)Re = I_1 Ra_1 - I_2 Ra_2 + Rma_1 \cdot I_1 \quad (6)$$

In like manner, the following equations are obtained on the cathode side.

$$Va + Vc + (I+I_5+I_4-i_5)Re = i_5 Rc_5 - i_4 Rc_4 + Rmc_4 \cdot i_5 \quad (7)$$

$$Va + Vc + (I+I_5+I_4+I_3-i_5 i_4)Re = i_4 Rc_4 - i_3 Rc_3 + Rmc_3(i_5+i_4) \quad (8)$$

$$Va + Vc + (I_5+I_4+I_3+I_2-i_5-i_4-i_3)Re = i_3 Rc_3 - i_2 Rc_2 + Rmc_2(i_5+i_4+i_3) \quad (9)$$

$$Va + Vc + (I+I_5+I_4+I_3+I_2+I_1-i_5-i_4-i_3-i_2)Re = i_2 Rc_2 - i_1 Rc_1 + Rmc_1(i_5+i_4+i_3+i_2) \quad (10)$$

$$Vpc = J \cdot Rpc + i_1 Rc_1 \quad (11)$$

$$J = i_1 + i_2 + i_3 + i_4 + i_5 \quad (12)$$

The foregoing are the circuit equations obtained from FIG. 8. In FIG. 8, the positions of Vc correspond to the positions of the respective cathode and thus if the currents flowing through these positions are uniform, there will be no unequality of the quantity of the charged electricity.

If the value of current passing through each cathode is a fixed value $\alpha$, then the following conditions are obtained $$I - J' + I_5 - i_5 = \alpha \quad (13)$$

$$I_4 = i_4 \quad (14)$$

$$I_3 = i_3 \quad (15)$$

$$I_2 = i_2 \quad (16)$$

$$I_1 = i_1 \quad (17)$$

In other words, it is only necessary that the values which satisfy the equations (14), (15), (16) and (17) are determined in accordance with the equations (1) to (12) so as to maintain the equality of the quantity of charged electricity.

In designing the present five-layer cell stack $ZnBr_2$ battery, the respective values are determined in the following manner.

Assumption (1)

All the shunt current value have a fixed value i $$i = i_1 = i_2 = i_3 = i_4 = i_5 = I_1 = I_2 = I_3 = I_4 = I_5 \quad (18)$$

Assumption (2)

The manifold internal electric resistances have a fixed value $$Rm = Rmc_1 = Rmc_2 = Rmc_3 = Rmc_4 = Rma_1 = Rma_2 = Rma_3 = Rma_4 \quad (19)$$

The electrode potentials are replaced with the open-circuit voltage.

$$Vo = Vc + Va \quad (20)$$

The equations (1)–(12) are modified as follows:

$$J = J' = 5 \cdot i \quad (21)$$

$$Vpa = J \cdot Rpa + i Ra_5 \quad (22)$$

$$Vo + (I - i)Re = i(Ra_4 - Ra_5 + 4Rm) \quad (23)$$
$$= i(Ra_3 - Ra_4 + 3Rm) \quad (24)$$
$$= i(Ra_2 - Ra_3 + 2Rm) \quad (25)$$
$$= i(Ra_1 - Ra_2 + Rm) \quad (26)$$
$$= i(Rc_5 - Rc_4 + Rm) \quad (27)$$
$$= i(Rc_4 - Rc_3 + 2Rm) \quad (28)$$
$$= i(Rc_3 - Rc_2 + 3Rm) \quad (29)$$
$$= i(Rc_2 - Rc_1 + 4Rm) \quad (30)$$

$$Vpc = JRpc + iRc_1 \quad (31)$$

By approximately $V_o + (I-i)Re = V_o + IRe$, the following readjustments are made $$Ra_5 = Rc_1 \quad (32)$$

$$Ra_4 = Rc_2 \quad (33)$$

$$Ra_3 = Rc_3 \quad (34)$$

$$Ra_2 = Rc_4 \quad (35)$$

$$Ra_1 = Rc_5 \quad (36)$$

$$Rpa = Rpc = Rp \quad (37)$$

$$Vpa = Vpc = Vp \quad (38)$$

$$Vp = i(5Rp + Rc_5) \quad (39)$$

$$Vo + IRe = i(Ra_4 - Ra_5 + 4Rm) \quad (40)$$
$$= i(Ra_3 - Ra_4 + 3Rm) \quad (41)$$
$$= i(Ra_2 - Ra_3 + 2Rm) \quad (42)$$
$$= i(Ra_1 - Ra_2 + Rm) \quad (43)$$

The respective values are determined by using the equations (32) to (43). Then, by selecting the condition constants of the battery as Vo=1.8V, Re=2×10$^{-2}$ Ω, Rm=63.5 Ω, on charge I=10A, shunt current value on charge i=4mA, Ra$_5$=Rc$_1$=100 Ω, and Rp=30 Ω, then the following are obtained Ra$_4$=Rc$_2$=346 Ω

Ra$_3$=Rc$_3$=655.5 Ω

Ra$_2$=Rc$_4$=1028.5 Ω

Ra$_1$=Rc$_5$=1465 Ω

Vp=1V

The above values are for changing and thus the left terms of the equations (40) to (43) vary for open-circuit condition and/or discharging. As a result, in order to satisfy the equations (40) to (43) with the resistances being fixed, it is only necessary to vary the value of the shunt current i correspondingly. Namely, the value of Vp in the equation (39) is varied. The following Table 1 shows the specific values corresponding to these conditions.

TABLE 1

|  | Vo + IRe (V) | i (mA) | Vp (V) |
| --- | --- | --- | --- |
| Charge | 2.0 | 4 | 1 |
| Open-Circuit | 1.8 | 3.6 | 0.9 |
| Discharge | 1.6 | 3.2 | 0.8 |

FIG. 7 shows by way of example the five-layer cell stack zinc bromide battery constructed in accordance with the above-mentioned design. The channels each has a diameter and length corresponding to the previously mentioned design resistance value. The corresponding relations between the channels and the resistances are as follows:

Rc$_1$→25, 33, Rc$_2$→26, 34, Rc$_3$→27, 35, ..., Ra$_1$→29, 37,
Ra$_2$→30, 38, Ra$_3$→31, 39, ..., etc.

The electrodes 65 and 66 are respectively fitted into the cathode electrolyte common manifolds 21 and 22 and the electrodes 77 and 78 are respectively fitted into the anode common manifolds 23 and 24. These electrodes are hermetically fixed in place. The electrodes 65 and 66 are connected to the negative terminal of the auxiliary power supply 76 whose positive terminal is connected to a cathode terminal 18 of the cell stack secondary battery. The electrodes 77 and 78 are connected to the positive terminal of the auxiliary power supply 79 whose negative terminal is connected to an anode terminal 75 of the cell stack secondary battery.

Figures 9A, 9B, 9C:
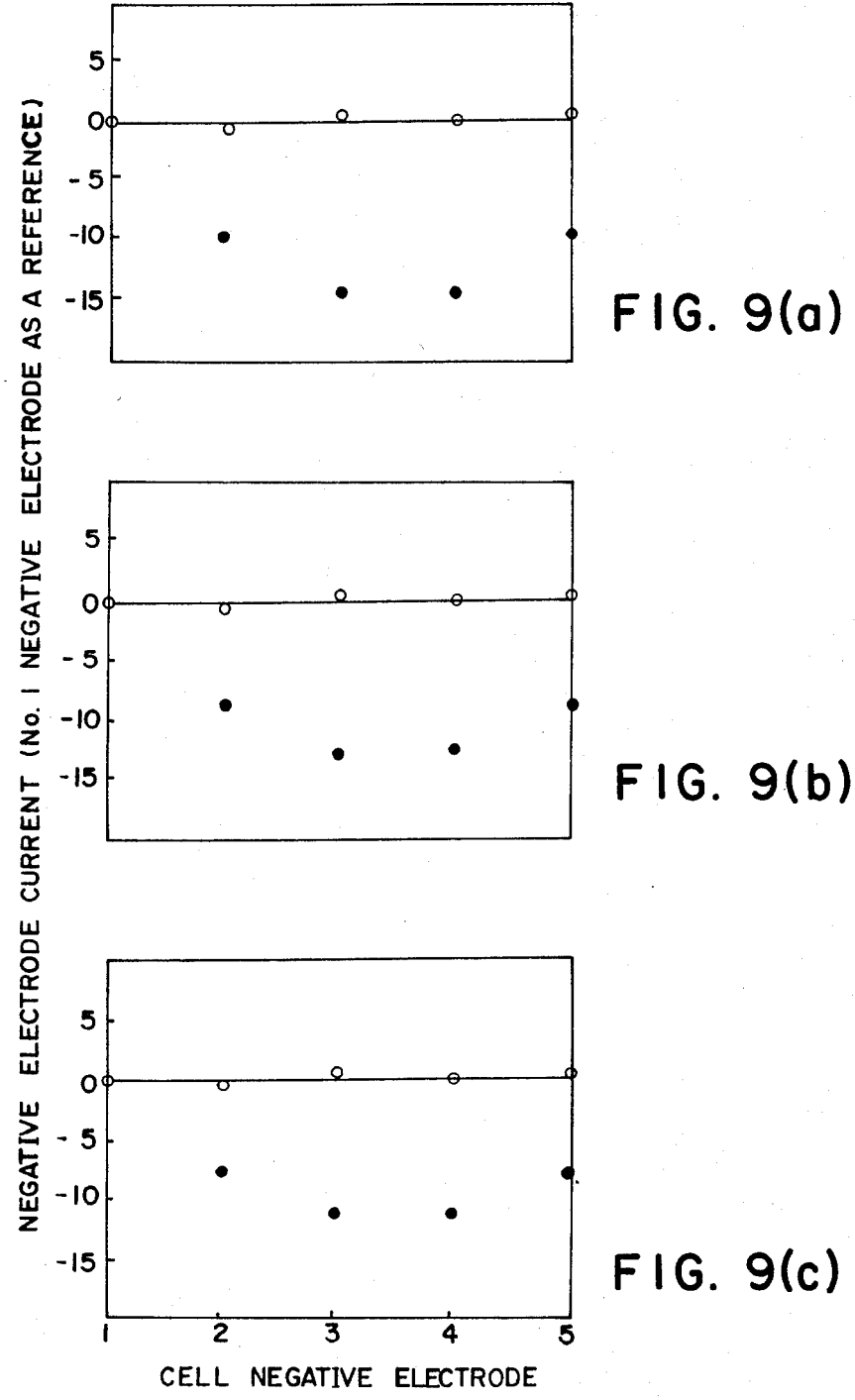

FIG. 9 shows the measurements of the values of the shunt currents which were supplied to the respective channels when ten cycles of three patterns, i.e., charge, open-circuit and discharge were performed in the five-layer zinc bromide secondary battery. the abscissa represents the numbers of the secondary cell cathode in order of increasing voltage and the ordinate represents the corresponding measured values. In the Figures, marks of 37 0" indicate the measured values obtained in accordance with the invention and marks of "0" indicate those obtained without the application of the invention, that is, those obtained by replacing the channel portions of the respective cells with the conventional ones to make the cells equal in channel electric resistance (all the channel electric resistances≈1500 Ω). FIG. 9 shows cathode current distribution diagrams showing the values of the currents through the cathode of the respective cells which were obtained from the shunt current values obtained in the above-mentioned manner and which are shown in terms of the value of the current through the lowest voltage cathode as a zero point. If the time factor is involved in the current values, these diagrams show charged electricity quantity distributions in terms of MA.h. In FIG. 9, (a) shows the distribution for charging condition, (b) the distribution for open-circuit condition (c) the distribution for discharging condition. As will be seen from the diagrams in (a), (b) and (c) of FIG. 9, the currents through the cathode are not the same in the case without the application of the invention (marked "0") and the existence of unequality of quantity of electricity is presumed, whereas the existence of equality of quantity of electricity is seen in the case using the present invention (marked "0"). After the ten cycles of operation, the electrodeposition of zinc on the cathode was examined with the result that there was the electrodeposition of the dendritic zinc on the cathode near the channels in the case without the application of the invention and that there was no trace of such abnormal electrodeposition in the case using the invention.

Also, the results of the calculations made from the measured shunt current values and the electrolyte electric resistance values in the manifolds and the channels showed that in the case using the invention the loss was 0.48 W showing only a slight increase over 0.14 W of the case without the application of the invention. On the other hand, in the case of the cell stack battery using the protective current according to the U.S. Pat. No. 4,197,169 but without the application of the invention the required protective current was about 32 mA and the calculated value of the loss due to the protective current was estimated to amount to 3.6 W. It will be seen from the foregoing that the present invention can realize a cell stack secondary battery which is small in loss, reduces the difficulties due to the shunt current and is long in cycle life.

While, in the above-described embodiment, the electrodes 65, 66, and 77, 78 are respectively fitted into the cathode electrolyte manifolds 21 and 22 and the anode electrolyte manifolds 23 and 24, it is possible to fit the electrodes 65 and 66 into the cathode electrolyte channels 25 and 33, respectively, and fit the electrodes 77 and 78 into the corresponding anode electrolyte inlet and outlet channels.

The present invention comprises the following solutions for providing improvements relating to the deficiencies due to shunt current, i.e., the occurrence of abnormal electrodeposition, unequality of quantity of charged electricity and shunt current loss.

In other words, in the anode chambers on the high voltage side shunt currents flow out to the anode electrolyte manifolds from the anode chambers and shunt currents are introduced from the anode electrolyte manifolds into the anode chambers on the low voltage side. In this case, the potential of the electrodes fitted into the cathode electrolyte manifolds is adjusted by the auxiliary power supply in such a manner that in the secondary cells on the low voltage side the value of a shunt current flowing out of the cathode electrolyte chamber becomes higher than that of a shunt current flowing into the anode chamber.

On the other hand, any unequality of quantity of charged electricity is caused by the fact that the sum total of the shunt currents flowing in and out through the channels is not zero in each of the secondary cells of the cell stack secondary battery except the highest voltage cell. Thus, in an attempt to overcome this deficiency additional channels and an additional manifold are provided to connect the anode chambers of the secondary cells to each other and an additional electrode is fitted into the additional channel or the additional manifold and connected to the positive terminal of the cell stack secondary battery through an auxiliarly power supply. While a small current flows into the anode chambers from this additional electrode, as will be described later, considering the size of the channels and the manifold interconnecting the anode chambers, the internal electrolyte electric resistance of the channels and the manifold are adjusted in such a manner that a current for supplementing the small currents flowing out of the secondary cells is supplied into the anode chambers through the channels and the manifold interconnecting these chambers and thus the small currents flowing in and out are reduced to zero on the whole in each of the secondary cells of the cell stack secondary battery except the highest voltage cell, thereby overcoming the problem of unequality of quantity of charged electricity.

Figure 10:
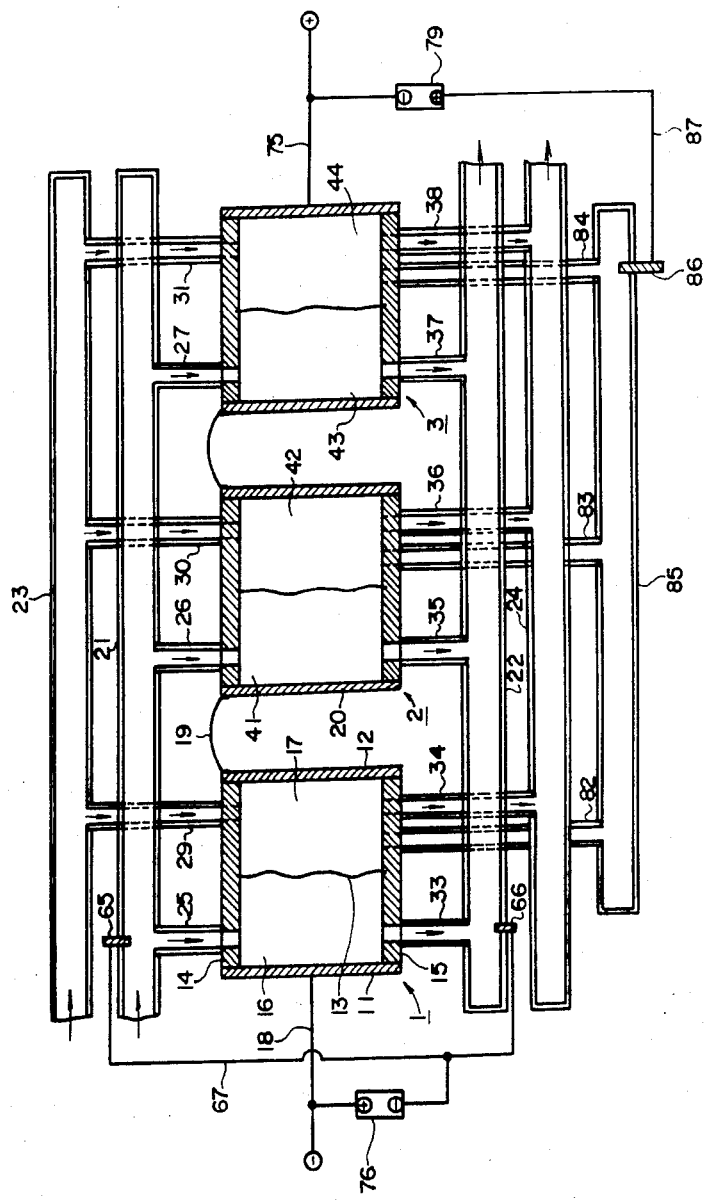

FIG. 10 is a longitudinal sectional view showing a three-layer cell stack secondary batter with shunt current protective means according to another embodiment of the invention, in which additional channels 82, 83 and 84 and an additional manifold 85 are connected to the respective anode chambers 17, 42 and 44. An additional electrode 86 is fitted into the manifold 85 and is hermetically fixed in place. The electrode 86 is connected by means of a connecting member 87 to the auxiliary power supply 79 connected to the positive terminal 75.

Next, description will be made of the method of adjusting the internal electrolyte electric resistance of the additionally provided manifold 85 and channels 82, 83, and 84 or the method of determining the size of the manifold 85 and the channel 82, 83 and 84.

Figure 11:
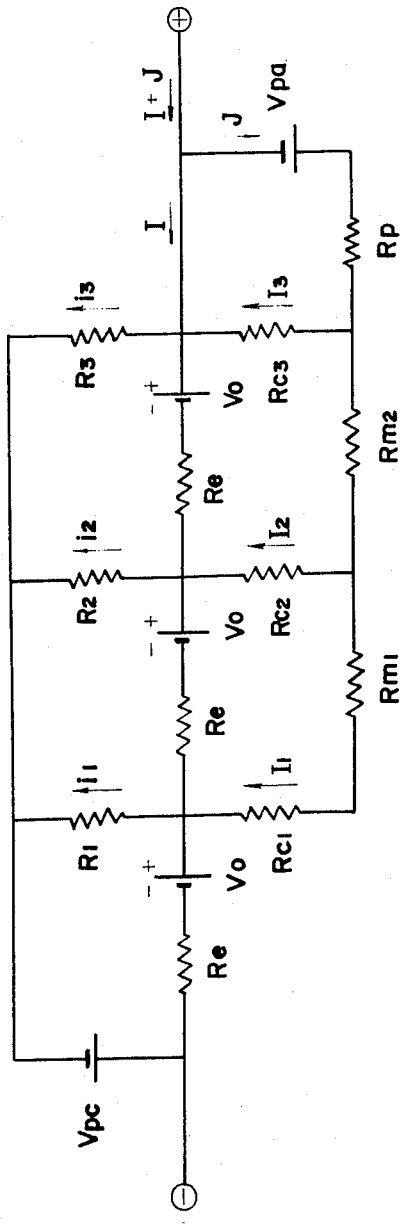

FIG. 11 illustrates a resistance equivalent circuit corresponding to the three-layer cell stack secondary battery of FIG. 10, and the symbols in the Figure denote as follows:

Vo: secondary cell open-circuit voltage.
Re: secondary cell internal resistance.
$R_1$, $R_2$, $R_3$: overall equivalent resistance of the internal electrolyte electric resistances of the cathode electrolyte and anode electrolyte outlet and inlet common manifolds and channels.
$i_1$, $i_2 i_3$: values of shunt currents flowing to the above equivalent resistances, that is, in the case of FIG. 10 where the electrodes 65 and 66 are respectively fitted in the cathode electrolyte manifolds 21 and 22 and the potential of the electrodes 65 and 66 is maintained by the auxiliary power supply 76 lower than the cathode terminal of the cell stack battery, $i_1$ represents the overall value of currents through the channels 25, 29, 33 and 34 of the secondary cell 1, $_2$ the similar current value for the secondary cell 2, and $i_3$ the similar current value for the secondary cell 3. These current values correspond to those obtained in the case without the provision of the manifold 85 and the channels 82, 83 and 84 interconnecting the anode chambers 17, 42 and 44. $I_1$, $I_2 I_3$: value of current flowing to the secondary cells 1, 2 and 3 from the additional manifold 85 and the channels 83, 83 and 84 interconnecting the anode chambers 17, 42 and 44.

$Rc_1$, $Rc_2 Rc_3$: internal electrolyte electric resistance values of the additionally provided channels 82, 83 and 84.
$Rm_1$, $Rm_2$: manifold internal electrolyte electric resistances between the additionally provided channels 82, 83 and 84.
Rp: internal electrolyte electric resistance of the manifold 85 between the additionally provided electrode and the junction of the manifold 85 and the channel 84 of the additionally provided channels 82, 83 and 84 which is closest to the anode terminal of the cell stack secondary battery.
Vpa: voltage of the auxiliary power supply (79 in FIG. 10).
Vpc: voltage of the auxiliary power supply (76 in FIG. 10).
J: sum of currents flowing into the secondary cells via the additionally provided manifold 85 and channels 82, 83 and 84.
I+J: input/output current of the cell stack secondary battery.

With this circuit, it is the purpose of the invention to set the values of $Rc_1$ to $Rc_3$, $Rm_1$, $Rm_2$ and Rp such that the current through the cathode of each cell or the charged electricity of each cathode is uniform.

In the equivalent circuit of FIG. 11, the essential requirement is to arrange such that the current through Vo and Re have a fixed value. If this fixed value is represent by $\alpha$, then the following equations are obtained $$I+I_3-i_3=\alpha \quad (44)$$

$$I+I_3-i_3+I_2=\alpha \quad (45)$$

$$I+I_3-i_3+I_2-i_2+I_1-i_1=\alpha \quad (46)$$

In other words, the following conditions are essential to ensure the equality of quantity of charged electricity $$I_2=i_2 \quad (47)$$

$$I_1=i_1 \quad (48)$$

Also, the following circuit equations relating to $Rc_1$, $Rc_2$, $Rc_3$, $Rm_1$, $Rm_2$ and Rp are obtained $$Vp=(I_1+I_2+I_3)Rp+I_3 Rc_3 \quad (49)$$

$$Vo+(I+I_3-i_3)Re=(I_1+I_2)Rm_2+I_2Rc_2-I_3Rc_3 \quad (50)$$

$$Vo+(I+I_3-i_3)Re=I_1Rm_1+I_1RC_1-I_2Rc_2 \quad (51)$$

As a result, it is only necessary that the values of $i_1$, $i_2$ and $i_3$ are determined first and then the values of $Rc_1$ to $Rc_3$, $Rm_1$, $Rm_2$ and Rp are set by using the equations (47) to (51).

In applying the present invention to the three-layer cell stack secondary battery, the following conditions are added.

$$I_3=i_3 \quad (52)$$

$$Rm=Rm_1=Rm_2 \quad (53)$$

Thus, by substituting the equations (52) and (53) into the equations (49), (50) and (51), the following equations are obtained.

$$Vp = (i_1 + i_2 + i_3) Rp + i_3 Rc_3 \quad (54)$$

$$Vo + IRe = (i_1 + i_2)Rm + i_2 Rc_2 - i_3 Rc_3 \quad (55)$$

$$Vo + IRe = i_1 Rm + i_1 Rc_1 - i_2 Rc_2 \quad (56)$$

Now, the method of determining the values of $Rc_1$, $Rc_2$ and $Rc_3$ from the equations 54, 55, and 56 will be described with reference to a case where the present invention is applied to a three-layer $ZnBr_2$ cell stack secondary battery.

To obtain the values of $i_1$, $i_2$ and $i_3$, the electrodes 65 and 66 are respectively fitted into the cathode electrolyte manifolds (21 and 22 in FIG. 10) of the cell stack secondary battery of FIG. 10 without the manifold 85 and the channels 82, 83 and 84 and the potential of the electrodes 65 and 66 is maintained by the auxiliary power supply 76 lower than the cathode terminal of the cell stack secondary battery. Then the battery is operated with the following charging conditions.

| | |
|---|---|
| each secondary cell charging voltage | $Vo + IRe \approx 2.0$ V |
| charging current | $I = 25$ A |
| auxiliary supply voltage | $Vpc = 1.0$ V |

The values of the shunt currents flowing through the electrolyte circulation channels (25, 29, 26, 30, 27, 31 and 33, 34, 35, 36, 37, 38 shown in FIG. 10) are measured with a clip-on ammeter and then the sum totals of the shunt currents flowing out of the respective secondary cells are obtained as follows:

$i_1 = 3$ mA $i_2 = 10$ mA $i_3 = 17$ mA

Now, if the following values are set $Vpa = 2.0$ V $Rp = 55 \, \Omega$ $Rm = 5.5 \, \Omega$ then, the following are obtained from the equations (54) to (56)

$Rc_1 \approx 1,421 \, \Omega$ $Rc_2 \approx 228 \, \Omega$ $Rc_3 \approx 21 \, \Omega$ By using these design values, the sizes of the channels and the manifold are adjusted and then the three-layer $ZnBr_2$ cell stack secondary battery is operated. In addition to the method of varying the channel size, the method of varying the number of channels also produces the same effect and also the same effect can be obtained by selecting $Rc_1 = Rc_2 = Rc_3$ and varying the resistance of the manifold. Further, the desired adjustments can be made by providing abstructions in the channels and the manifold.

Figure 12:
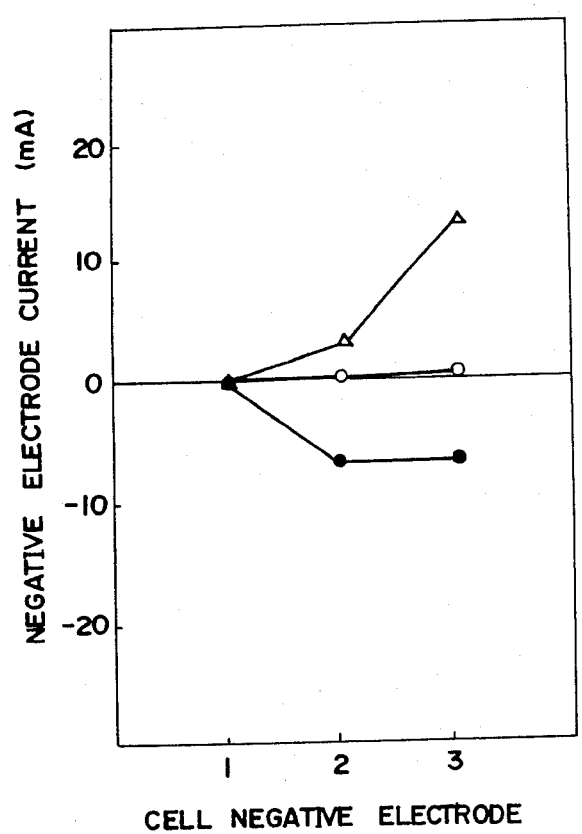

FIG. 12 shows the test results of the present embodiment. The values of currents through the cathode of the three-layer battery were measured by converting the currents through the respective channels and the current through the cathode (11 in FIG. 10) of the secondary cell having the lowest voltage among the cells of the three-layers of the secondary battery is selected as a zero point, thereby comparing the currents through the respective cathode and showing the resulting distribution of the quantities of charged electricity in the respective secondary cells. In the Figure, the ordinate represents the cathode current and the abscissa represents the secondary cell cathode.

Marked "0" is the case where the electrodes 65, 66 were not fitted in the cathode manifolds 21 and 22 and the manifold 85 and the channels 82, 83 and 84 were not provided in FIG. 10.

Marked "Δ" is the case where the electrodes 65 and 66 were fitted into the cathode manifolds 21 and 22 and the potential of the auxiliary power supply 76 was lower by 2 V than the cathode terminal of the cell stack secondary battery.

Marked "0" is the case where the manifold 85 and the channels 82, 83 and 84 were provided in addition to the electrodes 65 and 66 and the potential of the electrode 86 was higher by 2 V than the anode terminal of the cell stack secondary battery.

As shown in FIG. 12, it will be seen that in accordance with the present invention the currents flowing through the cathode of the respective cells are substantially the same with the resulting decrease in the unequality of quantity of charged electricity.

When the test was continued for ten hours in each of the cases and the electrodeposition of zinc on the surface of the cathode was examined for comparison purposes, there was electrodeposition of the dendritic zinc on the cathode ends near the channels in the case corresponding to the cell stack secondary battery without the application of the invention (Marked "0" in FIG. 12), and there was no trace of such abnormal electrodeposition in the cases of this embodiment incorporating the invention (marked "Δ" and "0" in FIG. 12).

Then, the loss due to the protective current was estimated on the basis of the currents through the channels and the manifolds and the internal electrolyte electric resistances of the manifolds and the channels and the results showed that in the case using the invention (marked "0" in FIG. 12) the loss was 208 mW and this was greater than 56 mW obtained in the case without the application of the invention (marked "0" in FIG. 12). However where the protective current according to U.S. Pat. No. 4,197,169 was applied to the known type of battery without using the invention, the required protective current was 364 mA and the calculated value of the loss due to the protective current was estimated to amount to 2,200 mW.

From the foregoing it will be seen that in accordance with this embodiment a cell stack secondary battery is provided which reduces the loss due to the protective current, reduces the deficiencies due to the flow of shunt current and increases the cycle life. Note that in some cases the cathode 65 and 66 may be connected directly to the cathode terminal of the cell stack secondary battery.

Figure 13:
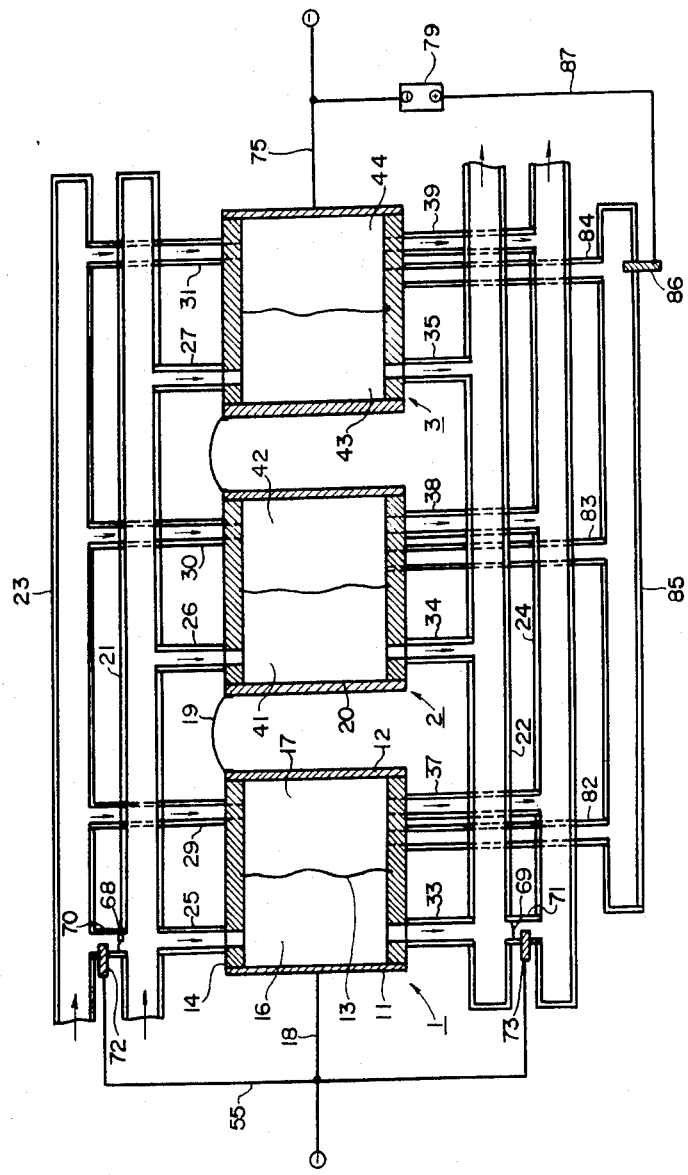

FIG. 13 is a longitudinal sectional view showing a cell stack secondary battery with shunt current protective means according to still another embodiment of the invention. In this embodiment, the cathode electrolyte manifolds 21 and 22 are respectively connected to the anode electrolyte manifolds 23 and 24 by pipes 70 and 71, respectively, and separators 68 and 69 are respectively firmly held in position in the pipes 70 and 71 to prevent the anode electrolyte and cathode electrolyte from mixing together. While, in the embodiment of FIG. 10, the electrodes 65 and 66 are fitted into the cathode electrode manifolds 21 and 22, in the present embodiment electrodes 72 and 73 are respectively fitted into the pipes 70 and 71 and immersed into the anode electrolyte divided by the separators 68 and 69. The electrodes 72 and 73 are connected to the terminal 18 by a connector 55 and are held at the same potential as the cathode 11 of the secondary cell 1. The electrodes 72 and 73 and the cathode 11 of the secondary cell 1 form a cell since the electrodes 72 and 73 are positioned in the anode electrolyte and the cathode 11 is in the cathode electrolyte on the other side of the separators 68 and 69, respectively. In other words, while the embodiment of FIG. 10 requires the auxiliary power supply 76, in the present embodiment the electrodes 72 and 73 are positioned in the anode electrolyte to produce an electrochemical potential difference and thereby to provide the equivalent function with the auxiliary power supply 76.

Thus, the cell stack secondary battery of this embodiment functions practically in the same manner as the embodiment of FIG. 10. Of course, the present embodiment may include the auxiliary power supply 76 so as to adjust the potential of the electrodes 72 and 73 as desired.

FIG. 14 is a longitudinal sectional view showing a cell stack secondary battery with shunt current protective means according to still another embodiment of the invention. This embodiment differs from the embodiment of FIG. 13 in that the electrode 86 fitted into the manifold 85 is eliminated and its function is served by the anode 12 of the secondary cell 3.

In applying this invention to this three-layer cell stack secondary battery, the current $(i_1+i_2+i_3)$ is supplied from the electrode 86 on the basis of the following assumption.

$$I_3 = i_3 \tag{52}$$

However, since $I_3=i_3$ is not the essential requirement, the values of $Rc_1$ to $Rc_3$ may be selected to obtain $I_3=-(i_1+i_2)$ and in this way the electrode 86 and the auxiliary power supply 79 in the embodiment of FIG. 10 or 13 may be eliminated.

Thus, it is only necessary to determine the values of $Rc_1$, $Rc_2$ and $Rc_3$ by using the following two equations in place of the equations (54), (55) and (56)

$$V_0+(I-i_1-i_2-i_3)Re=(i+i_2)Rm+i_2Rc_2+(i_1+i_2)Rc_3 \tag{57}$$

$$V_0+(I-i_1-i_2-i_3)Re=i_1Rm+i_1Rc_1-i_2Rc_2 \tag{58}$$

By selecting Vo=1.8 V, I=25 A, Re=0.008 Ω, Rm=5.5 Ω, $i_1$=3 mA, $i_2$=10 mA, $i_3$=17 mA and $Rc_3$=50 Ω in like manner as the embodiment of FIG. 10, then $Rc_2 \approx 128$ Ω and $Rc_1$=1,087 Ω result and the same effect as the embodiment of FIG. 10 can be expected.

In this case, it is possible to fit the electrode 86 into the manifold 85 and connect it to the anode 12 as shown by the phantom line in FIG. 14 so as to apply a potential thereto. By using the auxiliary power supplies, it is possible to set the anode and cathode terminal side manifold potentials to any desired low or high values and thus it is possible to reduce the channel and manifold electric resistance losses required for attaining the condition for realizing the invention, that is, the condition that the current flowing out of the cathode chamber is equal to the current flowing out of the anode chamber.

From the foregoing description it will be seen that the cell stack secondary battery with shunt current protective means according to the invention has the effect of making the current flowing out of the cathode chamber equal to the current flowing out of the anode chamber and thereby eliminating the occurrence of abnormal electrodeposition and the unequality of quantity of charged electricity and reducing the shunt current loss. Thus, the invention can be said to be very useful in practical applications.

I claim:

1. An electrolyte circulation type cell stack secondary battery comprising:
    (a) a first common manifold means through which a cathode electrolyte is supplied into said cell stack;
    (b) a second common manifold means through which said cathode electrolyte exits from said cell stack;
    (c) a third common manifold means through which an anode electrolyte is supplied into said cell stack;
    (d) a fourth common manifold means through which said anode electrolyte exits from said cell stack;
    (e) a plurality of at least three cells electrically connected in series between an anode terminal and a cathode terminal of the battery and in fluid connection in parallel between said respective manifolds, said respective cells being composed of a cathode chamber and an anode chamber which are divided by ion transmission separation means, said cathode chambers each being in fluid communication with said first common manifold means through first inlet channels extending between respective ones of said cathode chambers and said first common manifold means, said cathode chambers each being in fluid communication with said second common manifold means through first outlet channels extending between respective ones of said cathode chambers and said second common manifold means, said anode chambers each being in fluid communication with said third common manifold means through second inlet channels extending between respective ones of said anode chambers and said third common manifold means, said anode chambers each being in fluid communication with said fourth common manifold means through second outlet channels extending between respective ones of said anode chambers and said fourth common manifold means;
    (f) shunt current preventing means located at the lowest-cathodic potential side of said cell stack and having first and second electrodes respectively disposed in a first inlet channel and in a first outlet channel, each of said inlet and outlet channels being in fluid communication with the lowest-cathodic potential cell in said cell stack, each of said electrodes connected electrically to said cathode terminal; and
    (g) first passage means interconnecting said respective first inlet channels on a lower cathodic potential side of the cell stack and second passage means interconnecting said respective first outlet channels on said lower cathodic potential side of the cell stack, said lower cathodic potential side of the cell stack having a potential lower than an intermediate potential value between the cathode and anode terminals.

2. An electrolyte circulation type cell stack secondary battery comprising:
   (a) a first common manifold means through which a cathode electrolyte is supplied into said cell stack;
   (b) a second common manifold means through which said cathode electrolyte exits from said cell stack;
   (c) a third common manifold means through which an anode electrolyte is supplied into said cell stack;
   (d) a fourth common manifold means through which said anode electrolyte exits from said cell stack;
   (e) a plurality of at least three cells electrically connected in series between an anode terminal and a cathode terminal of the battery and in fluid connection in parallel between said respective manifolds, said respective cells being composed of a cathode chamber and an anode chamber which are divided by ion transmission separation means, said cathode chambers each being in fluid communication with said first common manifold means through first inlet channels extending between respective ones of said cathode chambers and said first common manifold means, said cathode chambers each being in fluid communication with said second common manifold means through first outlet channels extending between respective ones of said cathode chambers and said second common manifold means, said anode chambers each being in fluid communication with said third common manifold means through second inlet channels extending between respective ones of said anode chambers and said third common manifold means, said anode chambers each being in fluid communication with said fourth common manifold means through second outlet channels extending between respective ones of said anode chambers and said fourth common manifold means;
   (f) shunt current preventing means located at the lowest-cathodic potential side of said cell stack and including first pipe means extending between said first and third common manifold means in the vicinity of a first inlet channel in fluid communication with the lowest-cathodic potential cell in said cell stack, first ion transmission separation means disposed in said first pipe means to prevent fluid communication between said first and third common manifold means, second pipe means extending between said second and fourth common manifold means in the vicinity of a first outlet channel in fluid communication with the lowest-cathodic potential cell in said cell stack, second ion transmission separation means disposed in said second pipe means to prevent fluid communication between said second and fourth common manifold means, third pipe means extending between said first pipe means and said second pipe means to provide fluid communication of said anode electrolyte between said first and second pipe means, and first and second electrodes respectively disposed in said first and second pipe means and immersed in said anode electrolyte, each of said electrodes connected electrically to said cathode terminal.

3. An electrolyte circulation type cell stack secondary battery comprising:
   (a) a first common manifold means through which a cathode electrolyte is supplied into said cell stack;
   (b) a second common manifold means through which said cathode electrolyte exits from said cell stack;
   (c) a third common manifold means through which an anode electrolyte is supplied into said cell stack;
   (d) a fourth common manifold means through which said anode electrolyte exits from said cell stack;
   (e) a plurality of at least three cells electrically connected in series between an anode terminal and a cathode terminal of the battery and in fluid connection in parallel between said respective manifolds, said respective cells being composed of a cathode chamber and an anode chamber which are divided by ion transmission separation means, said cathode chambers each being in fluid communication with said first common manifold means through first inlet channels extending between respective ones of said cathode chambers and said first common manifold means, said cathode chambers each being in fluid communication with said second common manifold means through first outlet channels extending between respective ones of said cathode chambers and said second common manifold means, said anode chambers each being in fluid communication with said third common manifold means through second inlet channels extending between respective ones of said anode chambers and said third common manifold means, said anode chambers each being in fluid communication with said fourth common manifold means through second outlet channels extending between respective ones of said anode chambers and said fourth common manifold means;
   (f) shunt current preventing means located at the lowest-cathodic potential side of said cell stack and having a first electrode disposed in said first common manifold means in the vicinity of a first inlet channel in fluid communication with the lowest-cathodic potential cell in said cell stack, a second electrode disposed in said second common manifold means in the vicinity of a first outlet channel in fluid communication with the lowest-cathodic potential cell in said cell stack, conductor means electrically connecting said first electrode with said second electrode, and power supply means connected to said conductor means for holding said electrodes at a potential lower than that of said cathode terminal.

4. An electrolyte circulation type cell stack secondary battery according to claim 3, wherein said power supply means is electrically connected between said conductor means and said cathode terminal.

5. An electrolyte circulation type cell stack secondary battery comprising:
   (a) a first common manifold means through which a cathode electrolyte is supplied into said cell stack;
   (b) a second common manifold means through which said cathode electrolyte exits from said cell stack;
   (c) a third common manifold means through which an anode electrolyte is supplied into said cell stack;
   (d) a fourth common manifold means through which said anode electrolyte exits from said cell stack;
   (e) a plurality of at least three cells electrically connected in series between an anode terminal and a cathode terminal of the battery and in fluid connection in parallel between said respective manifolds, said respective cells being composed of a cathode chamber and an anode chamber which are divided by ion transmission separation means, said cathode chambers each being in fluid communication with said first common manifold means through first inlet channels extending between respective ones of said cathode chambers and said first common manifold means, said cathode chambers each being in fluid communication with said second common manifold means through first outlet channels extending between respective ones of said cathode chambers and said second common manifold means, said anode chambers each being in fluid communication with said third common manifold means through second inlet channels extending between respective ones of said anode chambers and said third common manifold means, said anode chambers each being in fluid communication with said fourth common manifold means through second outlet channels extending between respective ones of said anode chambers and said fourth common manifold means;

(f) shunt current preventing means located at the highest-anodic potential side of said cell stack and having a first electrode disposed in said third common manifold means in the vicinity of a second inlet channel in fluid communication with the highest-anodic potential cell in said cell stack, a second electrode disposed in said fourth common manifold means in the vicinity of a second outlet channel in fluid communication with the highest-anodic potential cell in said stack, conductor means electrically connecting said first electrode with said second electrode, and a power supply means connected to said conductor means for holding said electrodes at a potential higher than that of said anode terminal.

6. An electrolyte circulation type cell stack secondary battery according to claim 5, wherein said power supply means is electrically connected between said conductor means and said anode terminal.

7. An electrolyte circulation type cell stack secondary battery comprising:
(a) a first common manifold means through which a cathode electrolyte is supplied into said cell stack;
(b) a second common manifold means through which said cathode electrolyte exits from said cell stack;
(c) a third common manifold means through which an anode electrolyte is supplied into said cell stack;
(d) a fourth common manifold means through which said anode electrolyte exits from said cell stack;
(e) a plurality of at least three cells electrically connected in series between an anode terminal and a cathode terminal of the battery and in fluid connection in parallel between said respective manifolds, said respective cells being composed of a cathode chamber and an anode chamber which are divided by ion transmission separation means, said cathode chambers each being in fluid communication with said first common manifold means through first inlet channels extending between respective ones of said cathode chambers and said first common manifold means, said cathode chambers each being in fluid communication with said second common manifold means through first outlet channels extending between respective ones of said cathode chambers and said second common manifold means, said anode chambers each being in fluid communication with said third common manifold means through second inlet channels extending between respective ones of said anode chambers and said third common manifold means, said anode chambers each being in fluid communication with said fourth common manifold means through second outlet channels extending between respective ones of said anode chambers and said fourth common manifold means;

(f) first shunt current preventing means located at the lowest-cathodic potential side of said cell stack and having a first electrode disposed in said first common manifold means in the vicinity of a first inlet channel in fluid communication with the lowest-cathodic potential cell in said cell stack, a second electrode disposed in said second common manifold means in the vicinity of a first outlet channel in fluid communication with the lowest-cathodic potential cell in said cell stack, first conductor means electrically connecting said first electrode with said second electrode, and first power supply means connected to said first conductor means for holding said first and second electrodes at a potential lower than that of said cathode terminal; and (g) second shunt current preventing means located at the highest-anodic potential side of said cell stack and having a third electrode disposed in said third common manifold means in the vicinity of a second inlet channel in fluid communication with the highest-anodic potential cell in said cell stack, a fourth electrode disposed in said fourth common manifold means in the vicinity of a second outlet channel in fluid communication with the highest-anodic potential cell in said cell stack, second conductor means electrically connecting said third electrode with said fourth electrode, and second power supply means connected to said second conductor means for holding said third and fourth electrodes at a potential higher than that of said anode terminal.

8. An electrolyte circulation type cell stack secondary battery according to claim 7, wherein said first power supply means is electrically connected between said first conductor means and said cathode terminal, and wherein said second power supply means is electrically connected between said second conductor means and said anode terminal.

9. An electrolyte circulation type cell stack secondary battery comprising:
(a) a first common manifold means through which a cathode electrolyte is supplied into said cell stack;
(b) a second common manifold means through which said cathode electrolyte exits from said cell stack;
(c) a third common manifold means through which an anode electrolyte is supplied into said cell stack;
(d) a fourth common manifold means through which said anode electrolyte exits from said cell stack;
(e) a plurality of at least three cells electrically connected in series between an anode terminal and a cathode terminal of the battery and in fluid connection in parallel between said respective manifolds, said respective cells being composed of a cathode chamber and an anode chamber which are divided by ion transmission separation means, said cathode chambers each being in fluid communication with said first common manifold means through first inlet channels extending between respective ones of said cathode chambers and said first common manifold means, said cathode chambers each being in fluid communication with said second common manifold means through first outlet channels extending between respective ones of said cathode chambers and said second common manifold means, said anode chambers each being in fluid communication with said third common manifold means through second inlet channels extending between respective ones of said anode chambers and said third common manifold means, said anode chambers each being in fluid communication with said fourth common manifold means through second outlet channels extending between respective ones of said anode chambers and said fourth common manifold means;

(f) shunt current preventing means located at an anodic side of said cell stack and including additional common manifold means, said additional common manifold means being in fluid communication with said respective anode chambers through additional channel means extending from said additional common manifold means to said respective anode chambers, an electrode disposed in said additional common manifold means, said electrode being located in the vicinity of an additional channel means in fluid communication with the highest-anodic potential cell in said cell stack, and power supply means, said electrode being electrically connected to said power supply means and held at a potential higher than that of said anode terminal.

10. An electrolyte circulation type cell stack secondary battery according to claim 9, wherein said power supply means is electrically connected between said electrode and said anode terminal.

11. An electrolyte circulation type cell stack secondary battery comprising:

(a) a first common manifold means through which a cathode electrolyte is supplied into said cell stack;
(b) a second common manifold means through which said cathode electrolyte exits from said cell stack;
(c) a third common manifold means through which an anode electrolyte is supplied into said cell stack;
(d) a fourth common manifold means through which said anode electrolyte exits from said cell stack;
(e) a plurality of at least three cells electrically connected in series between an anode terminal and a cathode terminal of the battery and in fluid connection in parallel between said respective manifolds, said respective cells being composed of a cathode chamber and an anode chamber which are divided by ion transmission separation means, said cathode chambers each being in fluid communication with said first common manifold means through first inlet channels extending between respective ones of said cathode chambers and said first common manifold means, said cathode chambers each being in fluid communication with said second common manifold means through first outlet channels extending between respective ones of said cathode chambers and said second common manifold means, said anode chambers each being in fluid communication with said third common manifold means through second inlet channels extending between respective ones of said anode chambers and said third common manifold means, said anode chambers each being in fluid communication with said fourth common manifold means through second outlet channels extending between respective ones of said anode chambers and said fourth common manifold means;

(f) first shunt current preventing means located at the lowest-cathodic potential side of said cell stack and having a first electrode disposed in said first common manifold means in the vicinity of a first inlet channel in fluid communication with the lowest-cathodic potential cell in said cell stack, a second electrode disposed in said second common manifold means in the vicinity of a first outlet channel in fluid communication with the lowest-cathodic potential cell in said cell stack, conductor means electrically connecting said first electrode with said second electrode, and power supply means connected to said first conductor means for holding said first and second electrodes at a potential lower than that of said cathode terminal; and (g) second shunt current preventing means located at an anodic side of said cell stack and having additional common manifold means, a second power supply means and a third electrode disposed in said additional common manifold means, said additional common manifold means being in fluid communication with said respective anode chambers through additional channel means extending from said additional common manifold means to said respective anode chambers, said third electrode disposed in said additional common manifold means, said third electrode being located in the vicinity of said additional channel means in fluid communication with the highest-anodic potential cell in said cell stack, said third electrode being electrically connected to said second power supply means and held at a potential higher than that of said anode terminal.

12. An electrolyte circulation type cell stack secondary battery according to claim 11, wherein said first power supply means is electrically connected between said conductor means and said cathode terminal, and wherein said second power supply means is electrically connected between said third electrode and said anode terminal.

13. An electrolyte circulation type cell stack secondary battery comprising:

(a) a first common manifold means through which a cathode electrolyte is supplied into said cell stack;
(b) a second common manifold means through which said cathode electrolyte exits from said cell stack;
(c) a third common manifold means through which an anode electrolyte is supplied into said cell stack;
(d) a fourth common manifold means through which said anode electrolyte exits from said cell stack;
(e) a plurality of at least three cells electrically connected in series between an anode terminal and a cathode terminal of the battery and in fluid connection in parallel between said respective manifolds, said respective cells being composed of a cathode chamber and an anode chamber which are divided by ion transmission separation means, said cathode chambers each being in fluid communication with said first common manifold means through first inlet channels extending between respective ones of said cathode chambers and said first common manifold means, said cathode chambers each being in fluid communication with said second common manifold means through first outlet channels extending between respective ones of said cathode chambers and said second common manifold means, said anode chambers each being in fluid communication with said third common manifold means through second inlet channels extending between respective ones of said anode chambers and said third common manifold means, said anode chambers each being in fluid communication with said fourth common manifold means through second outlet channels extending between respective ones of said anode chambers and said fourth common manifold means;

(f) first shunt current preventing means located at the lowest-cathodic potential side of said cell stack and including first pipe means extending between said first and third common manifold means in the vicinity of a first inlet channel in communication with the lowest-cathodic potential cell in said cell stack, first ion transmission separation means disposed in said first pipe means to prevent fluid communication between said first and third common manifold means, second pipe means extending between said second and fourth common manifold means in the vicinity of a first outlet channel in fluid communication with the lowest-cathodic potential cell in said cell stack, second ion transmission separation means disposed in said second pipe means to prevent fluid communication between said second and fourth common manifold means, and first and second electrodes respectively disposed in said first and second pipe means and immersed in said anode electrolyte, each of said electrodes connected electrically to said cathode terminal; and (g) second shunt current preventing means located at an anodic side of said cell stack and including additional common manifold means, said additional common manifold means being in fluid communication with said respective anode chambers through additional channel means extending from said additional common manifold means to said respective anode chambers, a third electrode disposed in said additional common manifold means, said third electrode being located in the vicinity of an additional channel means in fluid communication with the highest-anodic potential cell in said cell stack, and power supply means, said third electrode being electrically connected to said power supply means and held at a potential higher than that of said anode terminal.

14. An electrolyte circulation type cell stack secondary battery according to claim 13, wherein said power supply means in electrically connected between said third electrode and said anode terminal.

* * * * *